(12) United States Patent
Pezet et al.

(10) Patent No.: US 12,325,068 B2
(45) Date of Patent: Jun. 10, 2025

(54) METHOD FOR THE ADDITIVE MANUFACTURE OF A COMPONENT FULLY OR PARTIALLY MADE UP OF A THREE-DIMENSIONAL LATTICE

(71) Applicant: AddUp, Cebazat (FR)

(72) Inventors: Didier Pezet, Cebazat (FR); Sebastien Devroe, Cebazat (FR)

(73) Assignee: ADDUP, Cebazat (FR)

( * ) Notice: Subject to any disclaimer, the term of this patent is extended or adjusted under 35 U.S.C. 154(b) by 0 days.

(21) Appl. No.: 17/773,111

(22) PCT Filed: Oct. 29, 2020

(86) PCT No.: PCT/FR2020/051953
§ 371 (c)(1),
(2) Date: Apr. 29, 2022

(87) PCT Pub. No.: WO2021/084207
PCT Pub. Date: May 6, 2021

(65) Prior Publication Data
US 2024/0149347 A1     May 9, 2024

(30) Foreign Application Priority Data
Oct. 31, 2019   (FR) ...................................... 1912250

(51) Int. Cl.
*B22F 10/28*      (2021.01)
*B22F 5/10*       (2006.01)
(Continued)

(52) U.S. Cl.
CPC ................ *B22F 10/28* (2021.01); *B22F 5/10* (2013.01); *B29C 64/153* (2017.08); *B33Y 10/00* (2014.12); *B33Y 80/00* (2014.12); *B22F 2998/10* (2013.01)

(58) Field of Classification Search
CPC ........ B22F 10/28; B22F 5/10; B22F 2998/10; B22F 10/00; B22F 3/1115; B29C 64/153;
(Continued)

(56) References Cited

U.S. PATENT DOCUMENTS 6,629,559 B2 * 10/2003 Sachs ........................ B22C 9/04
                                                              249/61
6,993,406 B1 *  1/2006 Cesarano, III ......... B33Y 80/00
                                                              700/118
(Continued)

FOREIGN PATENT DOCUMENTS

| CH | 409374 | 3/1966 |
|---|---|---|
| FR | 3059577 A1 | 6/2018 |
| WO | 2018/178313 A1 | 10/2018 |

OTHER PUBLICATIONS

International Search Report dated Feb. 1, 2021, in corresponding PCT/FR2020/051953 (4 pages).

*Primary Examiner* — Lawrence Averick
(74) *Attorney, Agent, or Firm* — VENABLE LLP

(57) ABSTRACT

A method for manufacturing a part made up entirely or partially of at least one three-dimensional lattice is disclosed. The three-dimensional lattice is produced by additive manufacturing by successive depositions of different layers of additive manufacturing powder and selective consolidation of the layers of powder along at least one path comprising different manufacturing vectors, the three-dimensional lattice comprising at least two layers of parallel strands that are spaced apart from one another, the strands of one layer extending in a longitudinal direction different from the longitudinal direction in which the strands of another layer extend. The manufacturing method provides that each strand is consolidated only via a plurality of manufacturing vectors extending in the longitudinal direction in which the strand extends.

10 Claims, 3 Drawing Sheets

(51) Int. Cl.
*B29C 64/153* (2017.01)
*B33Y 10/00* (2015.01)
*B33Y 80/00* (2015.01)

(58) Field of Classification Search
CPC ....... B29C 64/165; B33Y 10/00; B33Y 80/00; Y02P 10/25
See application file for complete search history.

(56) References Cited

U.S. PATENT DOCUMENTS

| | | | |
|---|---|---|---|
| 11,141,278 B2* | 10/2021 | Mullens | A61F 2/30907 |
| 2002/0157799 A1* | 10/2002 | Sachs | B22C 9/04 |
| | | | 164/4.1 |
| 2004/0099996 A1* | 5/2004 | Herzog | B33Y 30/00 |
| | | | 264/401 |
| 2020/0030102 A1* | 1/2020 | Mullens | A61F 2/34 |

* cited by examiner

[Fig.1]
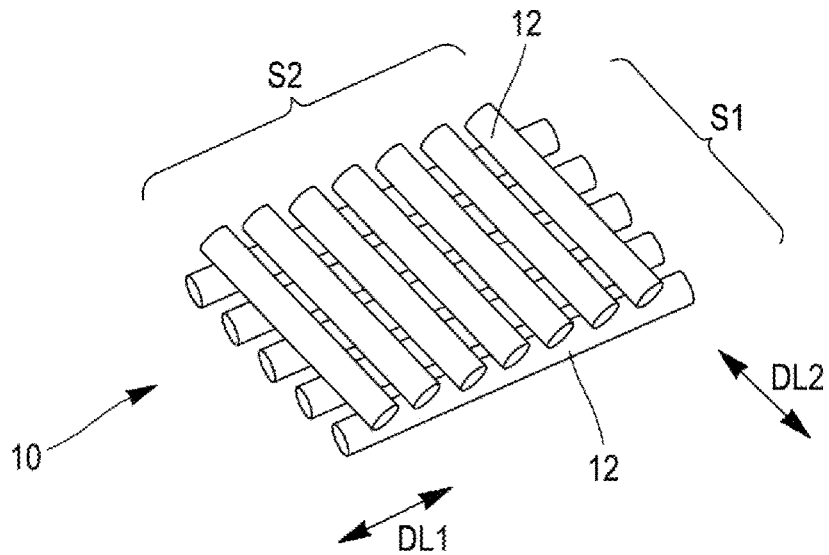
[Fig.2]
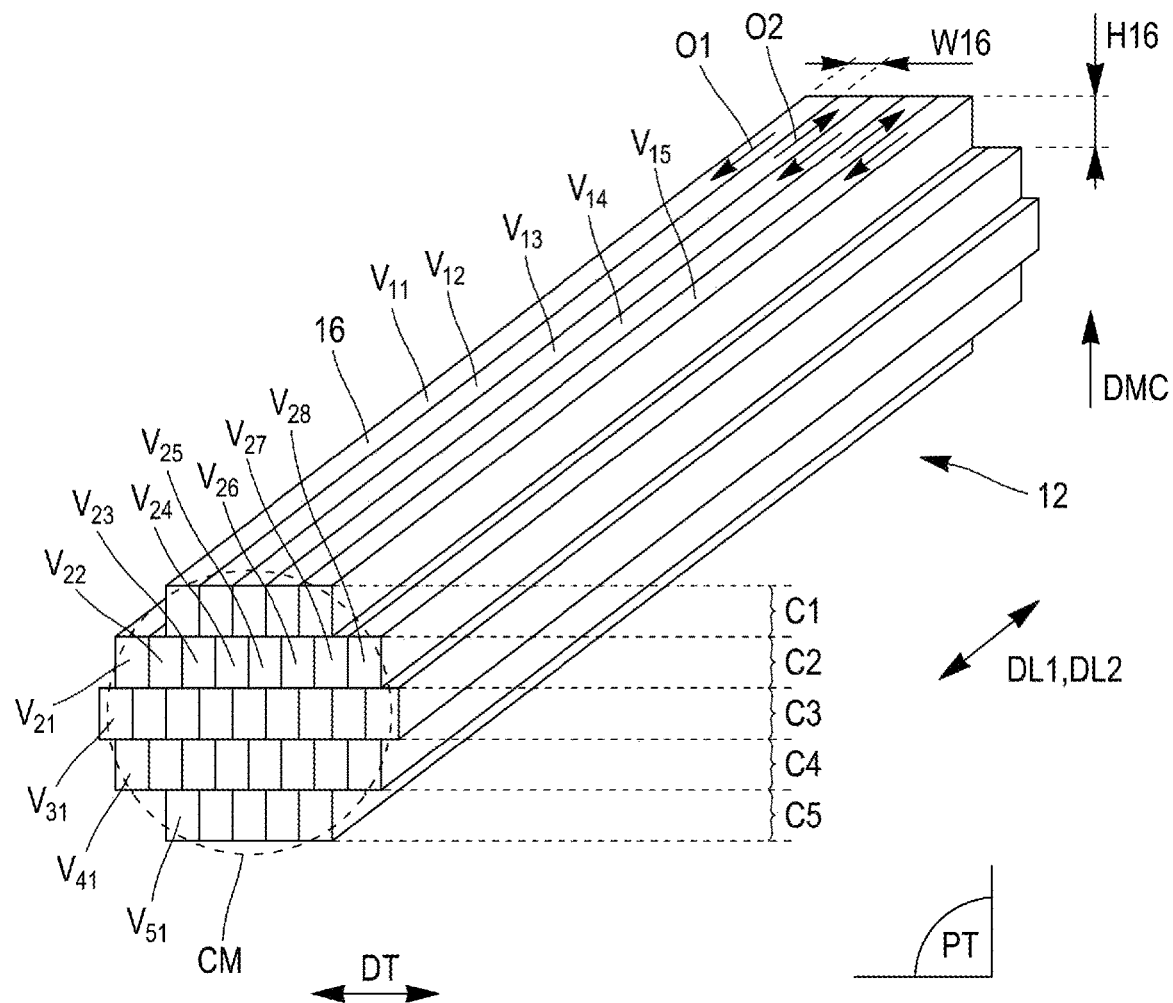

[Fig.3]
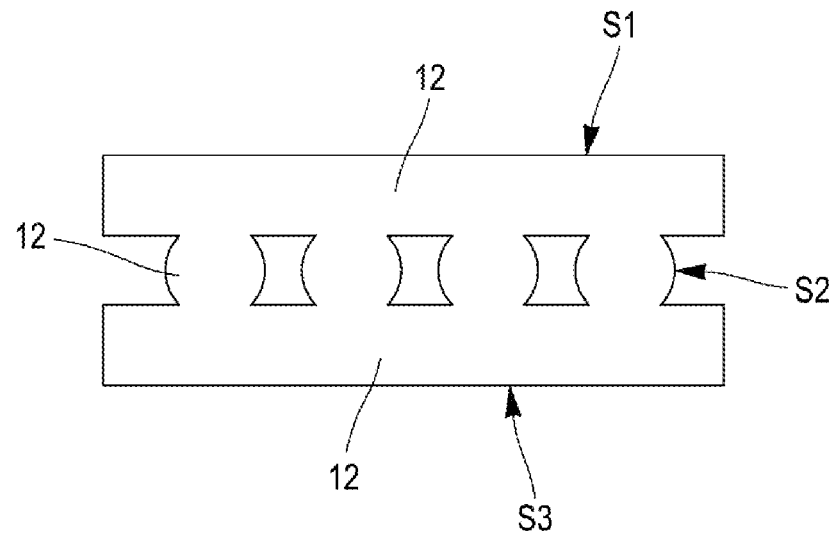
[Fig.4]
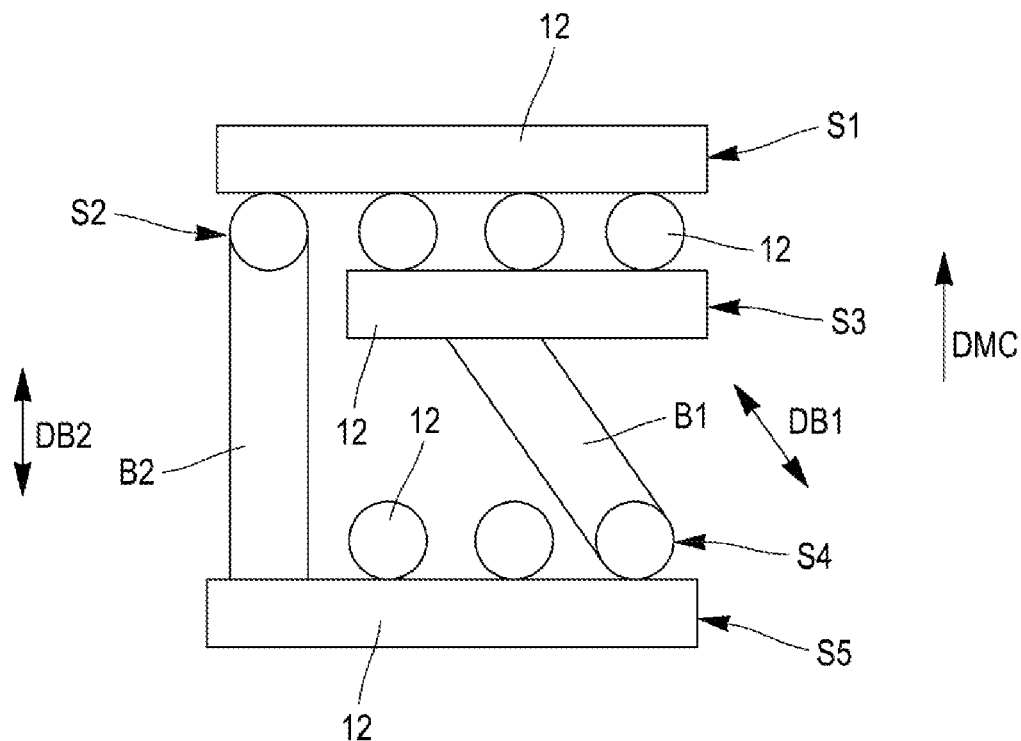

[Fig.5]
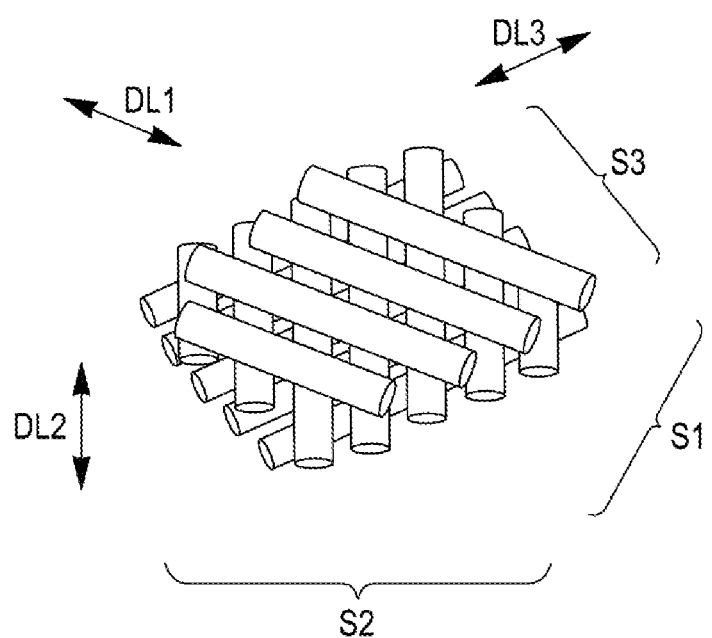

METHOD FOR THE ADDITIVE MANUFACTURE OF A COMPONENT FULLY OR PARTIALLY MADE UP OF A THREE-DIMENSIONAL LATTICE

BACKGROUND

The present invention relates to the additive manufacturing of a part made up entirely or partially of a three-dimensional lattice.

More specifically, the invention relates to the additive manufacturing by powder bed deposition of a part made up entirely or partially of a three-dimensional lattice, and the invention aims to reduce the time for manufacturing the three-dimensional lattice of such a part.

The patent application FR 3 059 577 relates to a method for manufacturing a moulding element comprising a cooling system incorporated within it and a base surface. The method comprises a step of depositing powder forming at least one layer by adhesion of the powder to the base surface by laser fusion, the deposition being effected in a random cellular structure and said at least one layer having passages disposed randomly, the passages forming a part of the cooling system.

In other words, the application FR 3 059 577 relates to a method for the additive manufacturing of a part made up entirely or partially of at least one three-dimensional lattice having a random arrangement.

According to the application FR 3 059 577, the three-dimensional lattice having a random arrangement promotes the cooling of the moulding element compared with the cooling channels that previously equipped such moulding elements.

However, the three-dimensional lattice having a random arrangement described in the application FR 3 059 577 does not afford an optimal manufacturing cost.

Specifically, as can be inferred from FIG. 3 of said application FR 3 059 577, in the different horizontal planes corresponding to the different layers of powder used to manufacture the moulding element, the horizontal sections of the three-dimensional lattice, that is to say the zones in which the powder is consolidated for example by laser beam fusion, are made up of a plurality of random shapes that are at a spacing and isolated from one another.

Consequently, for each layer of powder and in order to create the three-dimensional lattice, the laser beam has to travel along a large quantity of small manufacturing vectors with numerous jumps from one random form to be consolidated to another.

Multiplied by the large number of layers of powder required for the additive manufacturing of a moulding element, of the order of 1250 layers of a height of 50 millimetres to give an idea of scale, the large quantity of small manufacturing vectors and the large number of jumps considerably increasing the time and therefore the cost involved in manufacturing the moulding element.

It should be noted that the same drawbacks are found during the additive manufacturing of three-dimensional lattices having a non-random arrangement, for example of the octahedral type.

The objective of the present invention is to reduce the time and therefore the cost of manufacturing a part comprising a three-dimensional lattice using an additive manufacturing method involving powder bed deposition.

SUMMARY

To this end, the subject of the invention is a method for manufacturing a part made up entirely or partially of at least one three-dimensional lattice, this three-dimensional lattice being produced by additive manufacturing by successive depositions of different layers of additive manufacturing powder and selective consolidation of said layers of powder along a path comprising different manufacturing vectors, the three-dimensional lattice comprising at least two layers of parallel strands that are spaced apart from one another, the strands of one layer extending in a longitudinal direction different from the longitudinal direction in which the strands of another layer extend.

According to the invention, each strand is consolidated only via a plurality of manufacturing vectors extending in the longitudinal direction in which said strand extends.

By virtue of the combination of a three-dimensional lattice in the form of a stack of layers of horizontal and parallel strands and the additive manufacturing of said strands with manufacturing vectors extending along only the length of these strands, the method according to the invention makes it possible to maximize the length of the manufacturing vectors and to reduce the number of jumps between manufacturing vectors, thereby making it possible to reduce the time and the cost of manufacturing the part.

Advantageously, but not necessarily, the method according to the invention may also provide that:

each strand is consolidated via a plurality of manufacturing vectors extending in one and the same layer of powder and via a plurality of manufacturing vectors extending in several superposed layers of powder,
  the manufacturing vectors for a strand in a layer of powder are offset in a transverse direction orthogonal to the layering direction of the powder and orthogonal to the longitudinal manufacturing direction for the strands with respect to the manufacturing vectors for the same strand in the preceding layer of powder and/or in the following layer of powder,
  the manufacturing vectors for a strand in a layer of powder are disposed in a staggered manner in a transverse plane defined by the layering direction of the powder and the transverse direction with respect to the manufacturing vectors for the same strand in the preceding layer of powder and/or in the following layer of powder,
  the strands of a first layer intersect the strands of a second layer preceding or following this first layer in the layering direction of the powder,
  each strand has a section with a circular mean contour,
  the three-dimensional lattice comprises two successive series of layers that are at a spacing in the layering direction of the powder and connected by branches that extend in the layering direction of the powder,
  with the three-dimensional lattice comprising at least two successive layers of parallel strands that are spaced apart from one another, the strands of the first layer extend in a longitudinal direction inclined at 10 to 170° with respect to the longitudinal direction in which the strands of the second layer extend,
  with the three-dimensional lattice comprising at least two successive layers of parallel strands that are spaced apart from one another, the strands of the first layer extend in a longitudinal direction orthogonal to the longitudinal direction in which the strands of the second layer extend,
  the three-dimensional lattice comprises at least three successive layers of parallel strands that are spaced apart from one another, the strands of each layer extending in a longitudinal direction different from the longitudinal directions in which the strands of the other layers extend.

BRIEF DESCRIPTION OF THE FIGURES

Further features and advantages of the invention will become apparent from the following description. This description, which is given by way of non-limiting example, refers to the appended drawings, in which:

FIG. 1 schematically shows a first arrangement of the strands of a three-dimensional lattice that can be manufactured using the method according to the invention, FIG. 2 schematically illustrates the manufacturing vectors for a strand of a three-dimensional lattice manufactured using the method according to the invention, FIG. 3 illustrates a first variant of a three-dimensional lattice that can be manufactured using the method according to the invention, FIG. 4 illustrates a second variant of a three-dimensional lattice that can be manufactured using the method according to the invention, and FIG. 5 illustrates a second arrangement of the strands of a three-dimensional lattice that can be manufactured using the method according to the invention.

DETAILED DESCRIPTION

The invention relates to the additive manufacturing of a part made up entirely or partially of a three-dimensional lattice. A three-dimensional lattice is used for example to make a part lighter or to add a filtering structure with a targeted pressure drop to a part.

More specifically, the invention relates to the additive manufacturing of such a part by powder bed deposition.

Additive manufacturing by powder bed deposition is an additive manufacturing method in which one or more parts are manufactured by the selective consolidation of different layers of additive manufacturing powder superposed on one another. The first layer of powder is deposited on a support such as a plate, then selectively consolidated, for example by complete or partial fusion, using at least one consolidation source along a first horizontal section of the part(s) to be manufactured. Then, a second layer of powder is deposited on the first layer of powder that has just been consolidated, and this second layer of powder is selectively consolidated in turn, and so on until the last layer of powder is reached that is useful for manufacturing the last horizontal section of the part(s) to be manufactured.

The consolidation source may be a laser beam, an electron beam, a combination of a plurality of these beams, or a binder injection head.

In the context of the additive manufacturing method according to the invention, the three-dimensional lattice is produced by additive manufacturing by successive depositions of different layers of additive manufacturing powder and selective consolidation of said layers of powder along at least one path comprising different manufacturing vectors.

When the selective consolidation is effected by fusion with a laser beam or an electron beam, the consolidation path for a layer of powder is the path followed by the spot of the laser beam or of the electron beam over the layer of powder.

The manufacturing vectors are rectilinear segments of a consolidation path for a layer of powder.

More specifically, and as illustrated in FIG. 1, a three-dimensional lattice 10 according to the invention comprises at least two layers S1, S2 or parallel strands 12 that are spaced apart from one another. The strands 12 of one layer S1 extend in a longitudinal direction DL1 different from the longitudinal direction DL2 in which the strands of another layer S2 extend.

For example, with the three-dimensional lattice comprising at least two successive layers S1, S2 of parallel strands 12 that are spaced apart from one another, the strands of the first layer S1 extend in a longitudinal direction DL1 inclined at 10 to 170° with respect to the longitudinal direction DL2 in which the strands of the second layer S2 extend.

For example, with the three-dimensional lattice comprising at least two successive layers S1, S2 of parallel strands 12 that are spaced apart from one another, the strands of the first layer S1 extend in a longitudinal direction DL1 orthogonal to the longitudinal direction DL2 in which the strands of the second layer S2 extend.

As illustrated schematically in FIG. 2, the manufacturing method according to the invention provides that each strand 12 is consolidated only via a plurality of manufacturing vectors V extending in the longitudinal direction DL1, DL2 in which said strand extends.

In FIG. 2, the manufacturing vectors V are illustrated by the lines of powder 16 consolidated by a laser beam, an electron beam, a combination of a plurality of these beams, or a binder injection head. Schematically, these lines 16 take the form of parallelepipeds with a height H16 in the layering direction of the powder DMC and with a width W16 in a transverse direction DT orthogonal to the layering direction of the powder DMC and orthogonal to the longitudinal manufacturing direction DL1, DL2 for the strands.

The layering direction of the powder DMC and the transverse direction DT orthogonal to the layering direction of the powder DMC and orthogonal to the longitudinal manufacturing direction DL1, DL2 for the strands define a transverse plane PT.

As is shown by the end of the strand 12 illustrated in FIG. 2 in the transverse plane PT, a strand 12 is manufactured from a plurality of layers of powder C1, C2, C3, C4, C5 superposed in the layering direction of the powder DMC.

More specifically, each strand 12 is consolidated via a plurality of manufacturing vectors $V_{11}$, $V_{12}$, $V_{13}$, $V_{14}$, $V_{15}$ extending in one and the same layer of powder C1 and via a plurality of manufacturing vectors $V_{11}$, $V_{21}$, $V_{31}$, $V_{41}$, $V_{51}$ extending in a plurality of superposed layers of powder C1, C2, C3, C4, C5. For example, each strand 12 has a section with a circular mean contour CM.

To improve the mechanical integrity of a strand 12, the manufacturing vectors $V_{11}$, $V_{12}$, $V_{13}$, $V_{14}$, $V_{15}$ for a strand in a layer of powder C1 are preferably offset in the transverse direction DT with respect to the manufacturing vectors $V_{21}$, $V_{22}$, $V_{23}$, $V_{24}$, $V_{25}$, $V_{26}$, $V_{27}$, $V_{28}$ for the same strand in the preceding layer of powder C2 and/or in the following layer of powder.

As illustrated in FIG. 2, the manufacturing vectors $V_{11}$, $V_{12}$, $V_{13}$, $V_{14}$, $V_{15}$ for a strand in a layer of powder C1 may be offset in the transverse direction DT with respect to the manufacturing vectors $V_{21}$, $V_{22}$, $V_{23}$, $V_{24}$, $V_{25}$, $V_{26}$, $V_{27}$, $V_{28}$ for the same strand in the preceding layer of powder C2 and/or in the following layer of powder along the half-width of a manufacturing vector V, i.e. half the width W16 of a line of powder corresponding to a manufacturing vector.

Thus, in the transverse plane PT, the manufacturing vectors $V_{11}$, $V_{12}$, $V_{13}$, $V_{14}$, $V_{15}$ for a strand in a layer of powder may be disposed in a staggered manner in the transverse plane PT with respect to the manufacturing vectors $V_{21}$, $V_{22}$, $V_{23}$, $V_{24}$, $V_{25}$, $V_{26}$, $V_{27}$, $V_{28}$ for the same strand in the preceding layer of powder and/or in the following layer of powder, as long as it is not the last layer of powder that is useful for manufacturing this strand.

To reduce the time for manufacturing the three-dimensional lattice, the adjacent manufacturing vectors $V_{11}$, $V_{12}$ for a strand in one and the same layer of powder are travelled along in opposite directions O1, O2 in the longitudinal manufacturing direction of said strand. In other words, in each layer of powder used for manufacturing it, a strand 12 is manufactured using a back-and-forth strategy, without generating a contour.

In accordance with the manufacturing rules that have just been described, the method according to the invention makes it possible to manufacture a three-dimensional lattice with a time saving of 25% compared with other, prior art manufacturing methods In order to reinforce the three-dimensional lattice, and as illustrated schematically in FIG. 3, the strands 12 of a first layer S2 may intersect the strands of a second layer S1, S3 preceding or following this first layer in the layering direction of the powder DMC.

For certain uses of the three-dimensional lattice, it may be useful to space apart the strands of two successive layers. To this end, and as illustrated in FIG. 4, the three-dimensional lattice 10 may comprise two series S1, S2, S3 and S4, S5 of successive layers that are at a spacing in the layering direction of the powder DMC, and therefore in the height of the three-dimensional lattice 10, and connected by branches B1, B2 extending in the layering direction of the powder DMC. More specifically, the branches B1, B2 extend in directions DB1, DB2 that are perpendicular or inclined with respect to the longitudinal manufacturing directions DL1, DL2 for the strands of the two series of spaced layers.

Alternatively or in combination with a three-dimensional lattice comprising layers of orthogonal strands, the three-dimensional lattice 10 may also comprise at least three successive layers S1, S2, S3 of parallel strands that are spaced apart from one another, the strands of each layer extending in a longitudinal direction DL1, DL2, DL3 different from the longitudinal directions DL1, DL2, DL3 in which the strands of the other layers extend. In the example illustrated in FIG. 5, three layers S1, S2, S3 of strands are superposed and the longitudinal manufacturing direction for the strands of a layer is inclined at 120° with respect to the longitudinal manufacturing directions for the strands of the two other layers.

The invention claimed is:

1. A method for manufacturing a part made up entirely or partially of at least one three-dimensional lattice, the three-dimensional lattice comprising at least two layers of parallel strands that are spaced apart from one another, strands of one layer extending in a longitudinal direction different from a longitudinal direction in which strands of another layer extend, the method comprising:
producing the three-dimensional lattice by additive manufacturing by successive depositions of different layers of additive manufacturing powder and selective consolidation of the layers of powder along at least one path comprising different manufacturing vectors,
wherein each strand is consolidated via a plurality of manufacturing vectors extending in the longitudinal direction in which the strand extends, and
wherein each strand comprises multiple manufacturing vectors, some of the multiple manufacturing vectors being layered in a layering direction and some of the multiple manufacturing vectors being laid next to each other in a transverse direction to form each strand.

2. The method according to claim 1, wherein each strand is consolidated via a plurality of manufacturing vectors extending in one and the same layer of powder and via a plurality of manufacturing vectors extending in several superposed layers of powder.

3. The method according to claim 2, wherein the manufacturing vectors for a strand in a layer of powder are offset in the transverse direction orthogonal to the layering direction of the powder and orthogonal to the longitudinal direction for the strand with respect to the manufacturing vectors for a same strand in a preceding layer of powder and/or in a following layer of powder.

4. The method according to claim 3, wherein the manufacturing vectors for a strand in a layer of powder are disposed in a staggered manner in a transverse plane defined by the layering direction of the powder and the transverse direction with respect to the manufacturing vectors for the same strand in the preceding layer of powder or in a following layer of powder.

5. The method according to claim 1, wherein strands of a first layer intersect strands of a second layer preceding or following the first layer in the layering direction of the powder.

6. The method according to claim 1, wherein each strand has a section with a circular mean contour.

7. The method according to claim 1, wherein the three-dimensional lattice comprises two successive series of layers that are at a spacing in the layering direction of the powder and connected by branches that extend in the layering direction of the powder.

8. The method according to claim 1, wherein, with the three-dimensional lattice comprising at least two successive layers of parallel strands that are spaced apart from one another, strands of a first layer extend in a longitudinal direction inclined at 10 to 170° with respect to the longitudinal direction in which strands of a second layer extend.

9. The method according to claim 8, wherein, with the three-dimensional lattice comprising at least two successive layers of parallel strands that are spaced apart from one another, the strands of the first layer extend in a longitudinal direction orthogonal to the longitudinal direction in which the strands of the second layer extend.

10. The method according to claim 1, wherein the three-dimensional lattice comprises at least three successive layers of parallel strands that are spaced apart from one another, strands of each layer extending in a longitudinal direction different from the longitudinal directions in which strands of other layers extend.

* * * * *